Sept. 27, 1960 A. B. DUNWODY 2,954,173
PROCESS FOR CLEANING AND PULPING WASTE
Filed Dec. 11, 1958 2 Sheets-Sheet 1
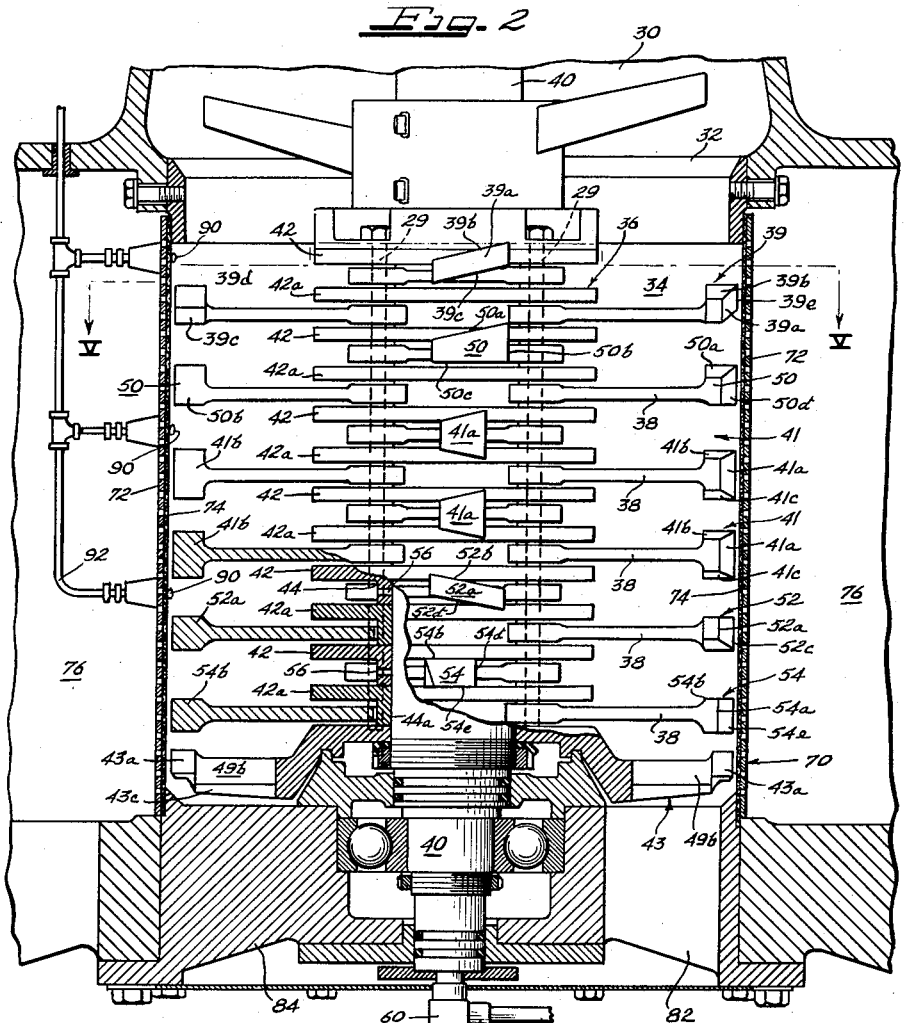
Fig. 2
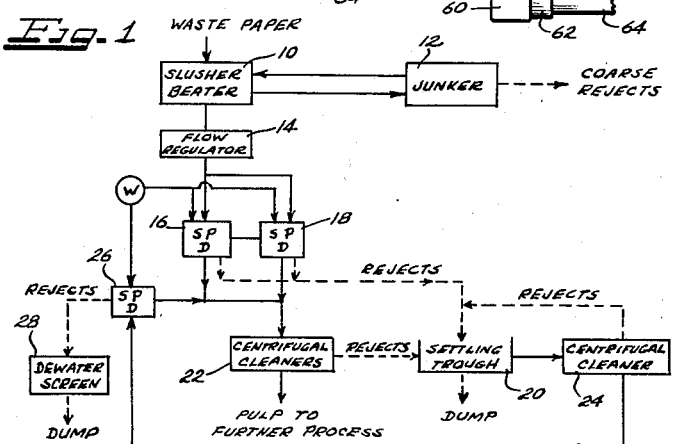
Fig. 1
Fig. 3
Inventor
ARCHIBALD B. DUNWODY
By Hill, Sherman, Meroni, Gross & Simpson
Attys.

Sept. 27, 1960  A. B. DUNWODY  2,954,173
PROCESS FOR CLEANING AND PULPING WASTE
Filed Dec. 11, 1958  2 Sheets-Sheet 2

Inventor
ARCHIBALD B. DUNWODY

United States Patent Office 2,954,173
Patented Sept. 27, 1960

2,954,173

PROCESS FOR CLEANING AND PULPING WASTE

Archibald B. Dunwody, 649 Hinman Ave., Evanston, Ill.

Filed Dec. 11, 1958, Ser. No. 779,755

6 Claims. (Cl. 241—24)

The present invention relates broadly to a method of defiberizing and cleaning waste material, and is more particularly concerned with a novel process for defiberizing and separating defiberized waste cellulosic fibrous material from non-cellulosic and generally non-fibrous foreign substances of the character normally found in paper, rags and like waste materials.

This application is a continuation-in-part of my copending patent application, Serial No. 651,039 which was filed on April 5, 1957.

It is known that many kinds of foreign matter are contained in waste paper as received at the mill, and such matter must be removed in order to obtain a high quality pulp product for the making of chipboard, cardboard and the like. As customarily understood, such foreign matter is divided into two classifications, namely, "heavy" substances consisting of metal, stone, glass and other particles which are more dense than the cellulosic fibrous material, and "light" substances consisting of cellophane, tape, string, wood, rubber and materials of nearly the same density or less density than the recoverable cellulosic material. Should any of the named substances enter the pulp stream, the finished paper or board is frequently degraded and the paper making machines damaged or plugged.

As is stated in my pending application, it is customary to wet and reduce the waste paper to a slush or coarse pulp in beaters or hydrapulpers equipped with extractor plates provided with a plurality of openings sufficient in size to pass the pulp and prevent passage of bulky deleterious and foreign substances. "Raggers" or "junkers" are conventionally employed to remove the bulky substances from the beaters or hydrapulpers.

As was also stated in my earlier case, the prior art machines used to remove foreign matter from waste paper pulp possess the common objection of resulting in excessive loss of good pulp with the rejected material, the discharge of too coarse a pulp for efficient operation in a subsequent centrifugal cleaner, their failure to remove light foreign material from the pulp, the necessity for recycling excessive quantities of pulp carried off with the rejected material, and other stated disadvantages. These objections were overcome by the method disclosed and claimed in my noted copending application, the method comprising subjecting a flowable aqueous slurry of fibrous material to an impact disintegrating action in a cylindrical disintegrating zone having a vertical axis to release fibers from the material and to propel the fibers outwardly, the method further consisting in the screening of the outwardly thrown disintegrated materially through a cylindrical screening zone, gravitationally separating from said zone material incapable of passing through the screening zone and discharging the same through a downwardly extending passage, and directing radial streams of water into said zone to aid in the disintegrating action.

While the earlier disclosed method has proven most effective in practice in the processing of quantities of cellulosic pulp of generally less than about 80 tons per day, it has subsequently been discovered that at higher mill capacities of up to about 250 tons per day dry basis increased usable pulp recovery and more complete defiberization is obtained by utilization of a pair of cylindrical disintegrating zones in parallel and a third cylindrical disintegrating zone in series therewith receiving "cycloned" material from the parallel zones. To explain briefly, the vertical differential disintegrators of the impact type which receive coarse pulp from a hydrapulper or beater are sensitive to volume, consistency and amount of deleterious matter, these variables often also being referred to as capacity, percent solids and "dirt," respectively. It is, of course, possible to control volume through flow regulator means, however, changes in the consistency and in the amount of deleterious matter take place at irregular intervals and with each rapid change useful pulp is rejected with the deleterious material. However, by employing a series cycle in which the rejects from the cyclones connecting with parallel disintegrators are recleaned, essentially all light and heavy deleterious matter is removed and the material finally rejected is continuously free of useful pulp.

It is accordingly a primary aim of the present invention to provide an improved method of pulping and cleaning waste paper and the like wherein the rejected deleterious material is essentially free of useful pulp.

Another object of this invention lies in the provision of a method for removing foreign matter from contaminated waste cellulosic fibrous material wherein the waste paper is subjected to a series of differential disintegrating steps intermediate which the accepted material is centrifugally cleaned to assure the entry into the pulp stream of reduced quantities of deleterious matter.

A further object of the invention is to provide an essentially continuous method of treating waste paper stock which is not substantially affected by the variables of volume, consistency and amount of deleterious matter in the stock.

An even further object of the present invention is to provide improvements in the method disclosed and claimed in my application Serial No. 651,039.

Other objects and advantages of the invention will become more apparent during the course of the following description, particularly when taken in connection with the accompanying drawings.

In the drawings, wherein like numerals are employed to designate like parts throughout the same:

Figure 1 is a flow chart illustrating a preferred cleaning cycle in accordance with the principles of this invention;

Figure 2 is a side elevational view, with parts in section, showing a disintegrating apparatus found particularly effective in carrying out the steps of the present method;

Figure 3 is an end view of one of the lowermost hammer arms of Figure 2;

Figure 5:
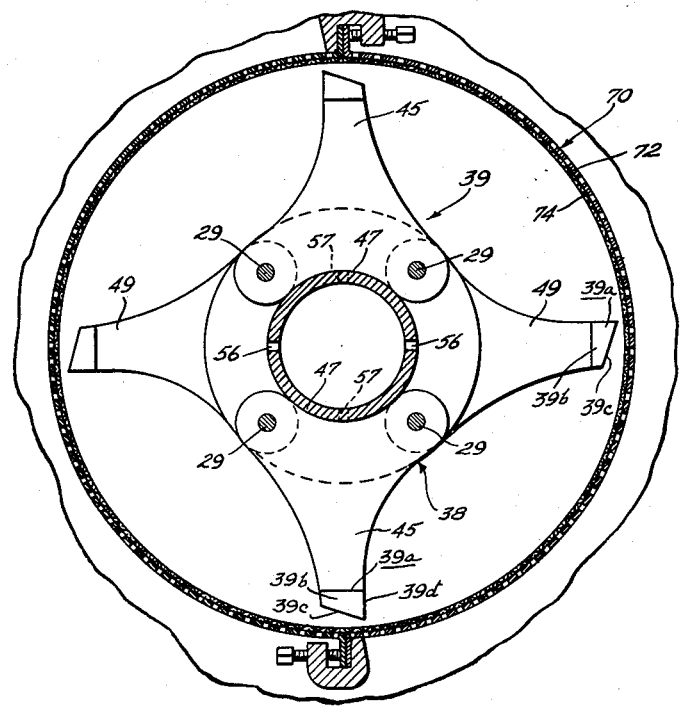
Figure 5 is a sectional plan view taken substantially along the line V—V of Figure 2, and showing the means utilized for directing water into the disintegration zone of the apparatus of Figure 2.

Particularly desirable results have been obtained in the practice of the present invention by utilization of disintegrating apparatus of the character illustrated in the drawings; however, it is to be appreciated that other differential disintegrators of the impact type may be utilized with satisfactory results. In addition, as will be apparent as the description proceeds, the improved method of applicant will be found to have substantial utility in the processing of waste cellulosic fibrous material other than paper.

Referring now particularly to Figure 1, there is shown in flow chart form a preferred method of practicing the present invention. Raw waste paper, rag stock and the like is introduced into a pulper or slusher 10, which may be in the form of a beater or hydrapulper, and within this unit the stock is mixed with hot water or water heated by steam and reduced to a slush or coarse pulp by utilization of suitable agitators (not shown). The slusher or beater 10 is preferably equipped with extractor plates having a plurality of openings therethrough of sufficient diameter to permit the flow of crude pulp, and the coarse rejects from the slusher or beater are removed by a junker or ragger 12. The openings in the extractor plates preferably have a diameter of between about ¾ of an inch to 1½ inches, whereby relatively coarse pulp, non-defiberized paper and other materials may pass therethrough. The materials passed through these openings are referred to herein as "coarse pulp."

In accordance with the teachings of the present process, the coarse pulp, which has a consistency of about 2½ to 5½% solids, is then directed to a flow regulator means 14 of any suitable known construction. While a range of between about 2½ to 5½% solids is preferred for reasons of reduced power consumption and overall efficiency, it is only required that the coarse pulp be in the form of a flowable slurry, and accordingly a consistency less than about 8 or 10% solids may be employed.

The coarse pulp slurry from the flow regulator 14 is passed in separate streams to a pair of separating pulper disintegrators 16 and 18 arranged in parallel as shown, and identified by the abbreviated designation "SPD." The separating pulpers 16 and 18 are normally essentially identical, and preferably are in the form of differential disintegrators of the impact type. In the pulpers 16 and 18, "light" and "heavy" foreign matter is gravitationally separated from the pulp stream and discharged as "rejects" in the manner of Figure 1 to a settling tank or trough 20, which may have in association therewith another tank receiving fibrous material which overflows from the trough 20. Within the disintegrators 16 and 18 the coarse pulp is defiberized and the more or less discrete pulp fibers are fed to a plurality of centrifugal cleaners or cyclones 22 which operate on the principle of accelerated settling in a fluid mass. While the number of the cyclones may be varied, four of such cleaners 22 have been found to produce the desired results in actual practice.

The good pulp from the centrifugal cleaners 22 is then further processed, which may include the utilization of decker thickeners, an asphalt dispersion unit, and a stock preparation system for the paper machines. "Heavy" foreign matter from the centrifugal cleaners 22 is also passed to the settling trough 20, such matter being referred to in Figure 1 as "rejects," or instead, the rejects from the centrifugal cleaners may pass to a tank receiving the overflow from the settling trough 20. A draw-off is provided from the settling trough or auxiliary tank and the material received therefrom is pumped to a centrifugal cleaner 24, which may be the same character as the cleaners or cyclones 22. The centrifugal cleaner 24 operates upon the same basis as the cleaners 22, and functions to reclean the fibrous material from the settling trough, returning heavy rejects to said settling trough. The pulp essentially free of the heavy rejects from the cyclone 24 is then directed to a third separating pulper 26, which is thus arranged in series with the parallel pulpers 16 and 18 and preferably is of the same construction. Experience has demonstrated that by utilization of the cyclone 24, which removes such heavy material as sand and the like, substantially longer life is obtained with the disintegrator 26.

Each of the separating pulpers 16, 18 and 26 are fed shaft water, the flow of which may be of the order of 35 gallons per minute when the system of Figure 1 is operated continuously at a capacity of about 250 tons per day. The second pass disintegrator 26, on the other hand, handles generally approximately 40 tons of pulp per day. The second pass disintegrator 26 functions to gravitationally separate any light deleterious material received from the cyclone 24 and effects further defiberization of the coarse pulp. The disintegrated, more or less discrete pulp fibers, from the separating pulper 26 are then joined with the pulp stream from the disintegrators 16 and 18. The material separated from the pulp stream in the disintegrator 26 is then directed into a dewatering screen 28, and the dewatered rejects therefrom as well as the heavy rejects from the settling trough 20 are then dumped.

The rejects of course vary in type and amount depending upon the incoming waste material. In actual practice of the process illustrated by the flow chart of Figure 1, however, it is found that the rejects from the second pass disintegrator 26 amount to about 1½ to 2 tons per day, when the system is continuously operated at capacity of about 250 tons per day. The rejects from the settling trough 20, on the other hand, after action of the centrifugal cleaners 22 and 24 total about ½ ton per day. It has been calculated that the total rejects represent approximately 1% of the total stock input to the system, and it has been found that these rejects contain approximately 25% useful fiber, which in large scale cleaning operations is quite uneconomical to recover. The disintegrators 16, 18 and 26 accomplish a substantial amount of defiberizing and simultaneously remove all light and heavy deleterious matter that is larger than the screen perforations in said disintegrators. By utilization of centrifugal cleaners as set forth in Figure 1, the stock is essentially clean since there is by this process removed from the stock all light deleterious matter which was formerly extremely difficult to remove by earlier processes. In fact, such light deleterious matter often was ground up in refining to the extent that much of it passed the screen in the disintegrator and later appeared as undesirable blemishes in the finished sheet.

As earlier noted, the separating pulpers 16, 18 and 26 may take various forms and preferably is a differential disintegrator of the impact type having the detailed structure first disclosed in my earlier filed patent application and shown herein as Figure 2. The disintegrators 16, 18 and 26 are each provided with a feed chamber 30 receiving the discharge from the slusher and beater 10, the pulp flowing from the feed chamber 30 through an opening into a disintegration zone 34. It is to be seen that the zone 34 is generally cylindrical and has a vertical axis, and mounted therein is a suitably driven rotor 36 provided with a plurality of superimposed, axially spaced impact units 38 supported on a drive shaft 40 by means of circumferentially spaced studs 29. As viewed in top plan, the rotor 36 rotates in a counter-clockwise direction.

Each of the impact or hammer units 38 includes a pair of superimposed spacer means 42 and 42a mounted in stacked relation to provide a support therebetween.

While the hammer flanges or spacers 42 and 42a are identical in form, said spacers are provided with dependent annular flanges 44 and 44a, respectively. Reference numeral 39 has been applied to the uppermost hammer unit, and it is to be seen from Figure 5 that said unit includes a pair of radially extending diametrically opposed arms 45 provided along their bases with arcuate inner edges 47 retained in abutment with the periphery of the flanges 44 by the studs 29 passing through suitable openings therein. As also appears in Figure 5, the uppermost hammer unit 39 is further provided with a pair of diametrically opposed, radially extending arms 49 provided with arcuate inner edges corresponding to the edges 47 for engaging the periphery of the flange 44a. The arms 45 and 49 of the hammer unit 39 function to feed the pulp downwardly through the central disintegration zone 34, and are provided for this purpose with tips 39a having on each a gently sloping upper face 39b, a similarly sloped lower face 39c to deflect the pulp downwardly, and a relatively flat leading face 39d effective to drive the pulp radially outwardly. The tip configuration of the hammer unit 39 may, of course, be varied, and in the exemplary form shown, the tips 39a are relieved as at 39e to provide a tapered trailing edge.

Referring again to Figure 2, and as was also earlier disclosed in my copending application Serial No. 651,039, the hammer unit adjacent the uppermost unit 39 has tips 50, each of which has a tapered upper face 50a, a flat leading edge 50b and a flat lower face 50c, relieved at 50d to provide a tapered trailing edge. The second and third impact units downwardly of the unit 39 are each indicated by the reference numeral 41 and have tips 41a, each of which has an inclined upper face 41b to lift the pulp in order to afford more even distribution thereof, and an oppositely tapered lower face 41c provided to downwardly direct material which comes in contact therewith.

Immediately below the units 41 is a unit 52 having tips 52a each provided with a forwardly tapered upper face 52b, a flat leading face 52c, a tapered lower face 52d essentially parallel with the face 52b, and each of which is relieved at 52e to form a tapered trailing edge. An additional unit 54 is provided below the unit 52, and the former impact unit has tips 54a, each of which has a relatively flat top face 54b and bottom face 54c, a flat leading face 54d, each relieved at 54e to form an inclined trailing edge. At the downward end of the rotor 36 a defecating hammer unit 43 is provided, having arms 49b terminating in tips 43a. Referring now to Figure 3, it is to be seen that the arms 49b have essentially flat forward impact faces 43b and substantially flat forward faces 43c inclined downwardly from the leading to the trailing edges. The upper edges of the faces 43b are advanced in order that said faces are tipped forwardly with respect to the direction of rotation. Accordingly, when material is impacted by the faces 43b and 43c, an essentially downward component of force is imparted to the impacted material. Further, as is also shown in Figure 3, the tips 43a each have a downwardly inclined lower edge 43d substantially parallel to the face 43c for the purpose of diverting deleterious matter downwardly as it is disintegrated.

Figure 4:
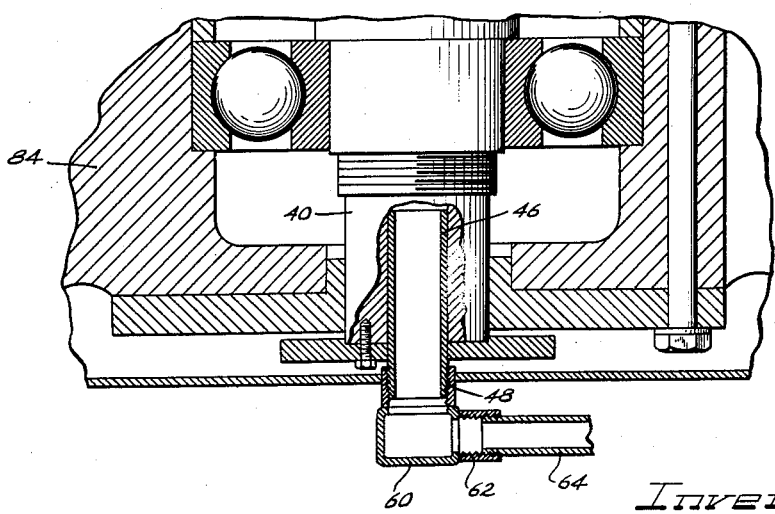
Figure 4 is an enlarged sectional elevational view to illustrate preferred means for introducing water into the disintegrator of Figure 2.

The earlier filed patent application noted above also brings out that water is introduced into the lower end of the drive shaft 40 and is sprayed into the disintegration zone 34 at a relatively high velocity. For this purpose, the shaft 40 is hollow and a sleeve 46 (Figure 4) is received within the lower end thereof. The sleeve 46 is externally threaded at 48 for reception of a header 60 provided with an internally threaded boss 62 receiving a water supply pipe 64. The shaft 40 is suitably apertured to afford communication of the water with the disintegration zone 34, and the spacer flanges 44 and 44a are each provided with circumferentially spaced openings 56 and 57, respectively, registering with the shaft apertures. By the arrangement thus provided, water is directed radially outwardly from the interior of the stacked spacers 42 and 42a into the pulp, and as the pulp is subjected to abrasion, scouring and impact rolling in the disintegration zone 34, the water jets from the openings 56 and 57 reduce the consistency of the pulp mass, to compensate for the loss of water upon contact with the feeder hammers 39 and to assist in washing pulp from material resistant to disintegration.

As earlier disclosed, there is located in closely spaced relation to the tips of the hammer arms 45, 49, and 49b a generally cylindrical screen assembly 70. Said screen assembly defines the cylindrical disintegrating zone 34, and preferably includes a reticulated outer casing 72 and liner 74 of relatively fine screen mesh. Accordingly, when contaminated pulp is struck or impacted by the arms and tips of the hammer units 39, 41 and 43, the pulp masses are substantially reduced in size so that the disintegrated fibers can readily pass radially through the screen assembly 70 to an annular primary discharge chute 76 (Figure 2), from which the fibers in aqueous suspension pass into the centrifugal cleaners or cyclones 22.

Material which is not disintegrated by impact with the upper hammer units settles by gravity in the disintegration zone 34 into contact with the defecating hammers 43. Said hammers 43 direct the deleterious material through secondary lower discharge openings 82 provided by a spider 84 supporting the rotor assembly in coaxial alignment with the screen assembly 70 and housing of the disintegrators 16, 18, and 26. The rejected deleterious material, comprising a mixture of heavy and light matter larger than the openings of the screen assembly 70 (generally 3/16 inch), is then passed to the settling trough 20 and processed therein in the manner earlier described. Water may also be introduced radially inwardly into the disintegration zone 34 through spaced orifices 90 in the casing 72 communicating with a water supply conduit 92. Accordingly, water can be discharged continuously into the zone 34 in two opposite radial directions to assure proper pulp dilution to carry out the separating and screening operations.

Substantial experience has demonstrated that when a single disintegrator equipped with a 75-horsepower, 1800 r.p.m. motor is utilized with 3/16 inch perforations in the round hole screen, the rejects obtained from the secondary discharge contain an appreciable amount of useful pulp. To overcome this difficulty, a 75-horsepower, 3600 r.p.m. motor was installed, and although it was generally believed that such higher rotational speeds would cause excessive wear and increase power consumption, it was found that only minor problems existed in this area and that the higher rotational speeds actually markedly improved the defiberizing action and produced rejects from the secondary discharge consisting of both light and heavy deleterious material containing only very little useful fiber.

Each disintegrating unit has a capacity of approximately 1 ton per daily horsepower.

Since maximum efficiency of the disintegrator by way of the character of rejects obtained therefrom requires in commercial operations a flow of crude pulp to the unit which is relatively uniform in consistency, volume and character, and it is difficult if not impractical to obtain this uniformity in mill operations, the arrangement of Figure 1 of the drawings was employed and immediately a substantial improvement obtained in the character of the rejects and the quality of the pulp received from the centrifugal cleaners 22 for further processing. To explain more fully, the separating pulpers are extremely sensitive to volume or capacity, consistency or percent solids, and amount of deleterious matter or "dirt" as used in the trade. In plant operations the volume can, of course, be controlled by flow regulator means, however, the changes in consistency and amount of deleterious matter which take place rapidly at irregular intervals, cause substantial amounts of useful pulp to be rejected with the "dirt." This is particularly true at higher capacities, and further, as the hammer units and screens wear, the motor load and reject character change substantially. Thus, in large scale mill operations, by reason of the direct relation between hammer wear, screen wear, and stock variation, substantial flexibility, capacity and disintegrator arrangement is required.

By the method of this invention, wherein the deleterious material from separating pulpers connected in parallel is subjected to a recleaning or cycloning and the accepted material therefrom passed into a third separating pulper in series, there is effected a flow into the pulp stream a higher quality material and the final rejects are continuously free of useful pulp. Specifically, while the rejected material from the disintegrators 16 and 18 is largely a mixture of heavy and light deleterious material larger than the screen openings in the disintegrators, there is actually useful pulp contained therein. The fibrous material in the rejects from the disintegrators is floated from the settling trough or auxiliary tank associated therewith, and after the relatively heavy material, such as sand or the like, mixed with the fibrous material is removed by the centrifugal cleaner 24, the recleaned fibrous material is passed into the disintegrator 26, which effects further defiberization and the removal of such light deleterious material as remains.

When the system of Figure 1 is operated at approximate capacity of 250 tons per day, the total rejects received from normal waste paper slush stock amount to approximately 1% of the total stock input, and of this percentage useful fiber comprises only about 25%, which is an amount uneconomical to recover.

Other modifications may also be effected such as utilizing more than a pair of disintegrators 16 and 18 in parallel, as well as more than a single disintegrator 26 in series. Further, one of the disintegrators 16 or 18 may be eliminated. The optimum arrangement, however, is that shown in Figure 1. In addition, instead of taking rejects from the first pass disintegrators 16 or 18 to a settling trough 20 and then to a cyclone, the pulp portion can be taken from the trough 20 to the second pass disintegrator 26. The accepts from the latter unit 26 can then go to a cyclone along with the accepts from the units 16 or 18.

Other modifications and variations may, of course, be effected without departing from the novel concepts of this invention. As for example, the disintegrators 16, 18 and 26 may be employed in a horizontal position employing a propelling type hammer to gradually force the foreign material out through the opposite end from the feed end, at the same time letting the released fibers go through the screens.

I claim as my invention:

1. A method of cleaning and pulping waste paper and like fibrous materials, which comprises subjecting a flowable slurry of the material to a differential disintegrating action effective to centrifugally discharge released fibers through a screening medium and gravitationally separate foreign matter, subjecting said released fibers to a centrifugal cleaning action to produce useful pulp and material of relatively greater density than said pulp and having fibrous material therewith, gravitationally separating the fibrous material from the relatively greater density material, and subjecting a flowable slurry of the resulting fibrous material to a differential disintegrating action to centrifugally discharge released fibers through a screening medium and gravitationally separate foreign matter.

2. A method of cleaning and pulping waste paper and like fibrous materials, which comprises subjecting a flowable slurry of the material to a differential disintegrating action effective to centrifugally discharge released fibers through a screening medium and gravitationally separate foreign matter, subjecting said released fibers to a centrifugal cleaning action to produce useful pulp and material of relatively greater density than said pulp and having fibrous material therewith, gravitationally separating the fibrous material from the relatively greater density material, subjecting the resulting fibrous material to a centrifugal cleaning action to produce pulp having light foreign matter therewith, and subjecting a flowable slurry of said pulp to a differential disintegrating action to centrifugally discharge released fibers through a screening medium and gravitationally separate foreign matter.

3. A method of cleaning and pulping waste paper and like fibrous materials, which comprises subjecting a flowable slurry of the material to a differential disintegrating action effective to centrifugally discharge released fibers through a screening medium and gravitationally separate foreign matter, subjecting said released fibers to a centrifugal cleaning action to produce useful pulp and material of relatively greater density than said pulp and having fibrous material therewith, gravitationally separating the fibrous material from the relatively greater density material, subjecting a flowable slurry of the resulting fibrous material to a differential disintegrating action to centrifugally discharge released fibers through a screening medium and gravitationally separate foreign matter, and combining the last-named released fibers with the first-named released fibers prior to subjecting the first-named fibers to a centrifugal cleaning action to substantially increase the concentration of useful pulp entering the cleaning action.

4. A method of cleaning and pulping waste paper and like fibrous materials, which comprises subjecting a flowable slurry of the material to a differential disintegrating action effective to centrifugally discharge released fibers through a screening medium and gravitationally separate foreign matter, subjecting said released fibers to a centrifugal cleaning action to produce useful pulp and material of relatively greater density than said pulp and having fibrous material therewith, gravitationally separating the fibrous material from the relatively greater density material, subjecting the resulting fibrous material to a centrifugal cleaning action to produce pulp having light foreign matter therewith, subjecting a flowable slurry of said pulp to a differential disintegrating action to centrifugally discharge released fibers through a screening medium and gravitationally separate foreign matter, and combining the last-named released fibers with the first-named released fibers prior to subjecting the first-named fibers to a centrifugal cleaning action to substantially increase the concentration of useful pulp entering the cleaning action.

5. A method of cleaning and pulping waste paper and like fibrous materials, which comprises subjecting a flowable slurry of the material to a differential disintegrating action effective to centrifugally discharge released fibers through a screening medium and gravitationally separate foreign matter, subjecting said released fibers to a centrifugal cleaning action to produce useful pulp and material of relatively greater density than said pulp and having fibrous material therewith, combining the foreign matter with the relatively greater density material having fibrous material therewith and gravitationally separating the fibrous material, subjecting the resulting fibrous material to a centrifugal cleaning action to produce pulp having light foreign matter therewith, subjecting a flowable slurry of said pulp to a differential disintegrating action to centrifugally discharge released fibers through a screening medium and gravitationally separate foreign matter, and combining the last-named released fibers with the first-named released fibers prior to subjecting the first-named fibers to a centrifugal cleaning action to substantially increase the concentration of useful pulp entering the cleaning action.

6. A method of cleaning and pulping waste paper and like fibrous materials, which comprises directing independent streams of a flowable slurry of the material to separate disintegrating actions effective to centrifugally discharge released fibers through screening mediums and gravitationally separate foreign matter, subjecting the released fibers from said separate disintegrating actions to a centrifugal cleaning to produce useful pulp and material of relatively greater density than said pulp and having fibrous material therewith, removing said fibrous material from the relatively greater density material and subjecting a flowable slurry of the resulting fibrous material to a differential disintegrating action to centrifugally discharge released fibers through a screening medium and gravitationally separate foreign matter, and combining the last-named released fibers with the first-named released fibers prior to subjecting the first-named fibers to a centrifugal cleaning action to substantially increase the concentration of useful pulp entering the cleaning action.

References Cited in the file of this patent

UNITED STATES PATENTS

| | | |
|---|---|---|
| 1,057,151 | Howard | Mar. 25, 1913 |
| 2,218,449 | Cowles | Oct. 15, 1940 |
| 2,543,599 | Rietz | Feb. 27, 1951 |
| 2,573,048 | Newkirk et al. | Oct. 30, 1951 |
| 2,886,287 | Croley | May 12, 1959 |